US008004706B2

(12) United States Patent
Birkenfeld et al.

(10) Patent No.: US 8,004,706 B2
(45) Date of Patent: Aug. 23, 2011

(54) DEVICE FOR PRODUCING A PRINTED IMAGE AT AT LEAST ONE PRINTED IMAGE LOCATION

(75) Inventors: Andreas Stefan Birkenfeld, Karlstadt-Hesslar (DE); Thomas Türke, Bielefeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 1098 days.

(21) Appl. No.: 11/793,627

(22) PCT Filed: Dec. 19, 2005

(86) PCT No.: PCT/EP2005/056918
§ 371 (c)(1),
(2), (4) Date: Jun. 20, 2007

(87) PCT Pub. No.: WO2006/067117
PCT Pub. Date: Jun. 29, 2006

(65) Prior Publication Data
US 2008/0151287 A1   Jun. 26, 2008

(30) Foreign Application Priority Data

Dec. 20, 2004  (DE) .............................. 102004061207
Apr. 19, 2005  (DE) .............................. 102005018367

(51) Int. Cl.
*G06F 3/12* (2006.01)
*G06K 15/00* (2006.01)
(52) U.S. Cl. ........................................ 358/1.15; 358/1.1
(58) Field of Classification Search .................. 358/1.1, 358/1.3, 1.4, 1.7, 1.9, 1.13, 1.15, 1.18, 515, 358/527; 101/142, 171, 189, 484
See application file for complete search history.

(56) References Cited

U.S. PATENT DOCUMENTS

| 5,255,085 | A | * | 10/1993 | Spence | 358/527 |
|---|---|---|---|---|---|
| 6,024,504 | A | | 2/2000 | Weichmann et al. | |
| 6,101,944 | A | | 8/2000 | Schmid et al. | |
| 6,588,336 | B2 | * | 7/2003 | Kaiser | 101/171 |
| 7,040,232 | B2 | * | 5/2006 | Van Holten et al. | 101/484 |
| 2001/0008106 | A1 | * | 7/2001 | Kaiser | 101/484 |
| 2002/0002916 | A1 | * | 1/2002 | Sugiyama | 101/142 |
| 2003/0048467 | A1 | | 3/2003 | Okamoto et al. | |
| 2004/0114125 | A1 | | 6/2004 | Kaiser et al. | |
| 2005/0199151 | A1 | * | 9/2005 | Holten et al. | 101/484 |
| 2006/0207450 | A1 | | 9/2006 | Buechner | |

FOREIGN PATENT DOCUMENTS

CA    2 366 940    7/2002

(Continued)

*Primary Examiner* — Gabriel Garcia
(74) *Attorney, Agent, or Firm* — Jones, Tullar & Cooper, P.C.

(57) ABSTRACT

A printed image is produced at least one printed image location using a printing machine with at least one illuminating device that produces at least one printed image at a number of printed image locations. These respective printed images belong to the same page of a printed product to be produced by the printing machine. This page of the printed product exists in the form of a file containing image data before it is produced as the printed image. That file contains image data of all of the printed images of the page of the printed product. A raster image processor is aligned with each printed image location and converts only image data of the printed images of the page of the printed product into raster data, with that printed image being assigned to a respective printed image position. A network is provided for use in the electronic communication of at least image data. Each raster image processor is connected to this network by an interface which receives data. The network provides the interface of each raster image processor with the file containing the image data of all of the printed images of the pages of the printed product.

55 Claims, 7 Drawing Sheets

FOREIGN PATENT DOCUMENTS

| | | |
|---|---|---|
| CA | 2 405 182 | 6/2003 |
| DE | 197 24 066 | 12/1998 |
| DE | 197 43 770 | 4/1999 |
| DE | 100 01 211 | 7/2001 |
| DE | 101 61 886 | 8/2002 |
| DE | 102 51 573 | 6/2003 |
| DE | 103 53 870 | 6/2004 |
| DE | 103 17 570 | 9/2004 |
| EP | 0 997 850 | 5/2000 |
| EP | 1 559 549 | 8/2005 |

* cited by examiner

DEVICE FOR PRODUCING A PRINTED IMAGE AT AT LEAST ONE PRINTED IMAGE LOCATION

CROSS-REFERENCE TO RELATED APPLICATIONS

This application is the U.S. national phase, under 335 USC 371, of PCT/EP2005/056918, filed Dec. 19, 2005; published as WO 2006/067117 A1 on Jun. 29, 2006 and claiming priority to DE 10 2004 061 207.2, filed Dec. 20, 2004 and to DE 10 2005 018 367.0, filed Apr. 19, 2005, the disclosures of which are expressly incorporated herein by reference.

FIELD OF THE INVENTION

The present invention is directed to a device for producing a printing image at least one printing image location. A printing press is provided with at least one illustrating device that forms at least one printed image at several printing image locations.

BACKGROUND OF THE INVENTION

An arrangement for rapid image transmission in printing presses, as well as a corresponding method, is known from DE 102 51 573 A1. Memory units are connected by a bus system with a computer, which computer is configured as a data manager for intermediate buffering of image data received from an RIP or raster image processor, as well as with the illustrating unit for image production. Each illustrating unit respectively communicates with one of the memory units and directly reads the image data out of the respective memory unit.

A method for the generation of screen data for image-producing units of a printing press is known from DE 100 01 211 A1. The raw image data is separated into a plurality of partial images, which respectively correspond to a printing ink color. The partial images are then output to a plurality of screen processors corresponding to the number of the colors to be printed. These partial images are processed by the screen processors during identical time periods into screen data for output to respectively one of the illustrating units.

A printing press having several forme cylinders and a control unit is known from EP 1 559 549 A1. The control unit arranged in the printing press is connected with an RIP or raster image processor via a LAN. The control unit downloads print data, generated by the RIP, from several print orders in previously fixed time intervals or at fixed times via the LAN into a memory of the control unit. The individual printing orders can be selected from a display device connected with the control unit.

A system for digital illustration is known from DE 103 53 870 A1. An image processing unit, which is arranged in a printing press and which is assigned to a printing group, comprises an RIP or raster image processor and a data buffer. The image processing unit is connected with a pre-printing stage interface, through which image data can reach the image processing unit.

An illustrating system is known from USP 2003/0048467 A1, which is connected to a local net, for example a LAN, or to a public net, for example the internet.

From EP 0 997 850 A1 it is known to provide a raster image processor or RIP in, for example, an FPGA or field-programmable gate array.

SUMMARY OF THE INVENTION

The object of the present invention is directed to providing a device for producing a printing image at least one printing image location, wherein the raster-forming process can be executed faster and according to the production requirements.

In accordance with the invention, this object is attained by the provision of at least one printing press with at least one illustrating device which forms at least one printed image at several printing image locations. The printed images are part of the same page of a printed product to be produced by the printing press. Prior to the formation of its printed image, the page of the printed product exists in the form of a data set containing image data. That data set contains image data of all of the printed images of the page of the printed product. A raster image processor is assigned to each printing location. Each such raster processor only converts image data of the printed image of the page of printed products into raster data.

The advantages which can be attained by the present invention lie, in particular, in that a raster-forming process can be performed faster and according to the production requirements. The decision as to which printing image is formed at which printing image location can be reserved until shortly before the execution of the printing command, because there is no rigid assignment of defined image data to a defined printing image location. Since every raster-forming process provides a raster of only a selected portion of the image data, the raster-forming process can be executed more rapidly than would be the situation with the use of a central raster image processor, which executes the raster-forming process for all of the portions of the image data. As a result, a flexible production of the printed product is made possible, with a free selection of the assignment of, for example, color extracts, in particular, to forme cylinders of a printing press. A high degree of availability regarding the press units partaking in the production process thus exists, which high degree of availability is very advantageous, in particular in complex printing presses with several sections, each with several press units.

The raster data, which are generated for each color separation of a page of the printed product to be manufactured, are generated in a decentralized manner in the near vicinity of the illustrating device. They can respectively be stored in a data set in a memory device. With this procedure, the time-intensive, interference-prone loading processes of large amounts of data from the pre-printing stage to the illustrating device in, or at least at, the printing press can be omitted. By the use of decentralized raster formation, the raster data are generated at the location where they are needed from by far less voluminous image data, which raster data are therefore more easily capable of being transmitted, for example via a network for electronic communication. By the use of the intermediate storage of the raster data, it is furthermore possible to avoid a summary of the voluminous data flow to be transmitted in the course of the illustration process. The raster-forming process can be decoupled from the illustrating process. Raster image processors, which are arranged in a decentralized manner, have the advantage that they can perform the raster-forming process parallel, i.e. simultaneously. This means a time advantage, in comparison to a single raster image processor centrally retained in the pre-printing stage. As a result, the raster-forming process can therefore be performed more rapidly and, in particular more in accordance with the production requirements, by taking into consideration arrangement information or placement information regarding the printing image position on the forme cylinder.

It is advantageous that an illustrating device, which is assigned to a forme cylinder, illustrates at least one printing image location, or printing forme. A different forme cylinder of the same printing press, which has at least one printing image location or printing forme, takes part in an ongoing printing process performed in this printing press. This has advantageous results regarding the production utilization which can be obtained with this printing press, and therefore its productivity. The concept of decentralized image processing thus has the advantage that each press unit of the printing press with its printing units and its various control devices, forms an independent unit, which independent unit can autonomously process and evaluate the image data of a page to be produced, as that image data is received from the pre-printing stage.

A communication system, which links various networks with each other, and in particular which links a network for the transmission of image data to at least one illustrating device with a network for the control and/or monitoring of a printing press and/or with a network for transmitting data to be processed in the pre-printing stage, improves communication between all positions of an installation which is involved in the production of printed products because of the increased transparency of the communication processes. Such a system also helps, in a not inconsiderable way, in saving expenses, which otherwise would arise from the multiple provision of signal lines and/or transmission paths, as well as their interfaces.

Further advantages of the present invention can be found in the following detailed description.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
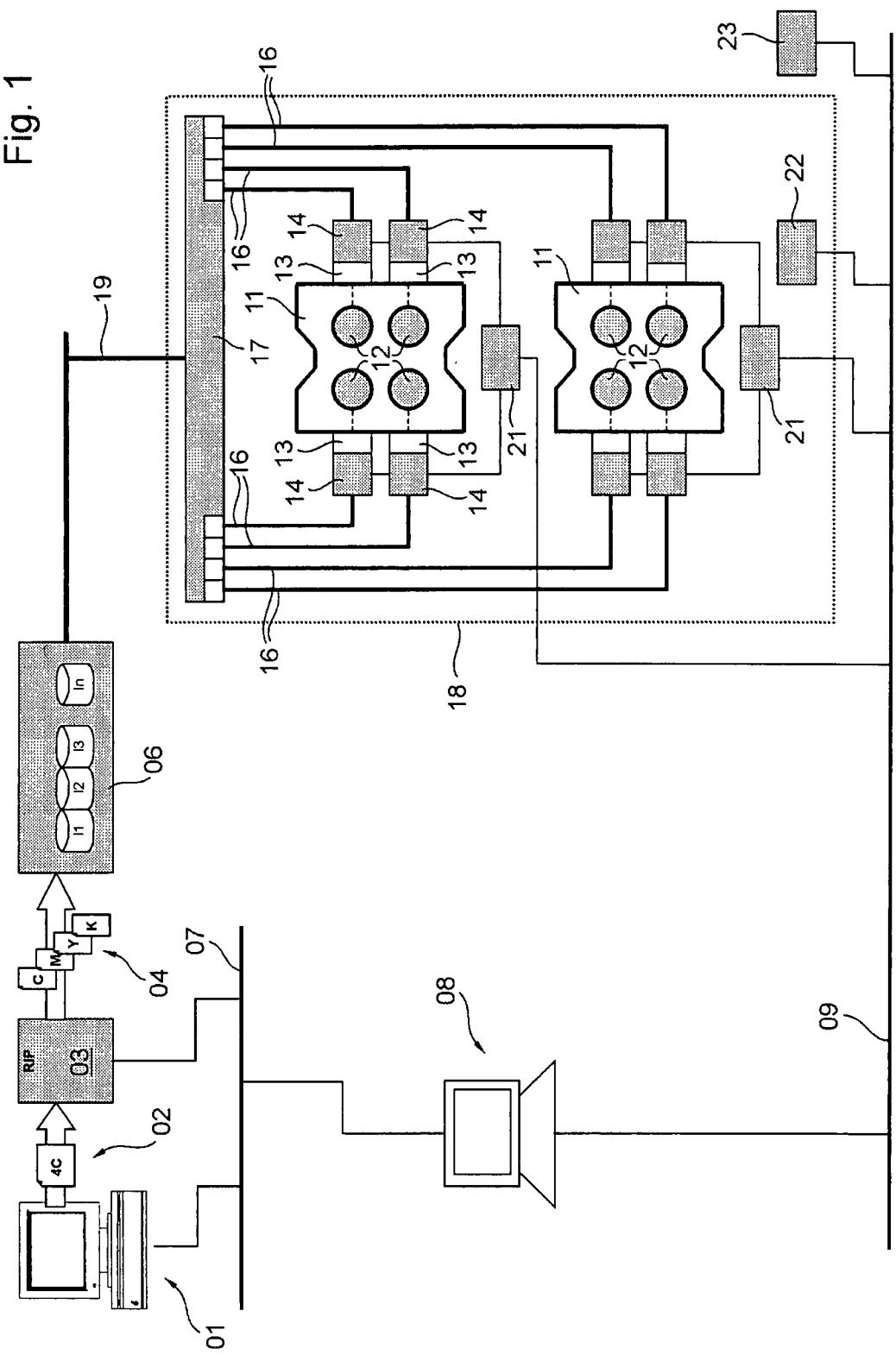
FIG. 1, a schematic depiction of an image data management system, with a central image management device in the form of a star topology, in FIG. 2, a schematic depiction of an image data management system, with a central image management device in the form of a line or a ring topology, in FIG. 3, a schematic depiction of an image data management system, with a central image management device in the form of a double-star topology, in FIG. 4, a schematic depiction of an image data management system, with a local image management device in the form of a star topology, in FIG. 5, a schematic depiction of an image data management system, with a central file server in the form of a star topology, in FIG. 6, a schematic depiction of an example of the drive management in a printing press, and in FIG. 7, a schematic side elevation view of an example of a folding apparatus which can be incorporated into the control network in accordance with the present invention.

FIGS. 1 to 5 respectively each show image data managing systems, each with a central image management device, and with different topologies of a network for transmitting image data. It is common to all of the image data management systems represented in FIGS. 1 to 5 that image data 02 are respectively combined in a computer 01 of a pre-printing stage, which is located ahead of the actual printing process, to form a page, which page is to be imprinted in different, such as, for example, in four different printing colors. The page to be imprinted can contain text, graphics and/or at least one image, and the image data therefore contain information regarding the contents, the color and the layout of the page to be imprinted. The image data 02 of a page of a printed product to be imprinted are combined in a data set, which data set can be processed by the use of electronic data processing, or in a telegram which can be transmitted over a transmission path. Therefore, the pre-printing stage is a work area in which a page of a printed product to be imprinted is put together, if desired, and is processed. The page of the printed product is, at least, made available for the subsequent printing process.

As a rule, a printed product to be manufactured by the printing press, consists of several imprinted pages. These imprinted pages can be collected, in accordance with a specification laid down in the pre-printing stage, in a further processing device which is arranged downstream of the actual printing process, such as, for example, in a folding apparatus that is assigned to the printing press, and can be there combined into the desired printed product. The amount of image data 02 corresponding to each one of the pages to be imprinted is, as a rule, combined in a single data set. This data set can easily amount to several MB, megabytes located in a two- or even three-part range. It is at present customary, for example, to combine such image data 02 in the form of a pixel-based TIFF, or tagged image file format data set, in the form of a contour-data-coded postscript data set, or in the form of a pdf, or portable document format data set, in a format combining pixel and contour data structures, and to make them available for transmission to at least one computer that is located downstream in the processing operation. Each one of the pages to be imprinted can have a resolution of, for example, approximately 1200 dpi to 2400 dpi, so that a data set on the order of 1 Gbit and more, or clearly more than 100 Mbytes, results. In that case, the amount of data typically lies in the range of 400 Mbytes, or more, for a page to be imprinted in four colors. An amount of data, in the range of several Gbytes, then results for a complete newspaper with several, for example 48 pages and more. The transmission of this amount of data, via a network, makes great demands on this network which transmits the image data 02.

Such a downstream computer 03, which is arranged downstream in the processing operation, can be, for example, a raster image processor, or RIP 03 which, when required, converts the necessary image data 02 from the pre-printing stage into a pixel-oriented data format, i.e. a bit map format. The raster image processor, or RIP, 03 generates raster data 04 from the image data 02 by the use of suitable computing operations. It can also be provided that color separations, also called color extracts, which are assigned to the printing colors, are created from the image data 02 prior to their conversion into raster data 04, either before they are conducted to the raster image processor, or RIP 03, or in the raster image processor, or RIP, 03. Each color separation generates a printing image to be printed. The page to be formed by the printing process is generated by printing the several printing images of different color separations, all belonging to a page, on top of each other on a material to be imprinted, such as, for example, a web of material or a printed sheet. In four-color printing, the color separations C, M, Y and B are customary, which are assigned to the four colors cyan, magenta, yellow and black. For each of the printing colors, the raster image processor, or RIP 03 generates the raster data 04 accompanying each respective color separation. The raster data 04 belonging to one of the color separations specify at least the size and position of each raster point of the respective color separation, each of which raster point is to be imprinted by a printing group of a printing press on the material to be imprinted. This specification of the raster points increases the data set for the amount of image data 02, that is associated with the printed page of the printed product to be printed, by a greater than negligible amount. Instead of relating the position and size of the raster point to the arrangement of the raster point on the material to be imprinted, the specification of the raster point can also relate to its arrangement in relation to a forme cylinder 12 of the printing group of a printing press which takes part in the printing process. The specification of the raster point can state where the raster point is to be arranged, taking into consideration the angular position of the forme cylinder 12, for example, in regard to the shell surface of the forme cylinder 12. In this way, the raster points are assigned, with their respective specification, to a definite printing image location in the printing press.

It is advantageous to store each of the raster data 04 generated by the raster image processor, or RIP 03, for each of the color separations which are part of a page to be produced, preferably in a data set in a memory device 06, and to keep them ready for call-up in that memory device 06. The raster data 04 of entire color separations, or of a portion of at least one color separation, can be placed into intermediate storage in the memory device 06. Intermediate storage of the raster data 04 has the advantage that a summary of the voluminous data flow to be transmitted, in the course of the illustration process, can be avoided. The computer 01 of the pre-printing stage, the raster image processor, or RIP 03 and/or the memory device 06 can each be advantageously connected with a network 07 for transmitting, particularly for transmitting electronically, data to be processed in the pre-printing stage. The image data 02, which is connected with a page of the printed product to be imprinted, can be processed, for example, by the computer 01 of the pre-printing stage included in this network 07 by the use of at least one program which is customary for use in office communications, such as, for example, for data processing or for graphic processing. At the same time, a computer 08, for use in the control and/or monitoring of the printing press which is performing the printing process, is preferably connected to this network 07, which is a part of the pre-printing stage. The computer 08, for use in the control and/or the monitoring of the printing press, is also connected with a network 09 for use in the control and/or monitoring of the printing press. All of the required press processes can be coordinated via the network 09 for control and/or monitoring of the printing press. For example, the control of the drive mechanisms of the printing press, and along with this, the angular position of the forme cylinders 12, the bringing into and out of contact of the forme cylinders 12 with transfer cylinders working together with the respective forme cylinders 12, a control of the forme cylinders 12 relative to a device which cuts and/or folds the material to be imprinted, or a control of a device affecting the transport of the material to be imprinted during the printing process, can be part of this network 09. The network 09 for control and/or monitoring of the printing press will be explained in detail later in connection with FIG. 6.

The computer 08 for control and/or monitoring of the printing press is, for example, configured as a control console 08, which is a part of the printing press, or which is, at least, integrated into a control console 08, which is a part of the printing press, as seen in FIGS. 1 to 5. By the attachment of the computer 08 for control and/or monitoring of the printing press, by the use of data technology, to the raster image processor, or RIP 03 and/or to the memory device 06, it is possible to assign to each of the raster data 04 to be generated, for each of the pages to be produced, a printing location within the printing press which corresponds to a printing image location. The computer 08 for control and/or monitoring of the printing press has data available, such as, for example, data regarding the occupation of the forme cylinder 12, which are part of the printing press with respectively at least one printing forme. The printing forme has at least one printing image location, with a printing image to be formed at this printing image location, as well as data regarding the printing process. The data, in regard to the printing process, contain information, in particular with respect to the sequence of the color separations regarding the page to be produced in respect to the transport direction of the material to be imprinted by the printing press. The data for the occupation of the forme cylinders 12, which are part of the printing press with respectively at least one printing forme, are contained, for example, in an electronically stored placement plan.

An area to be assigned to the actual printing process, and which, in particular, is configured as a press room, and into which at least one printing press performing the printing process has been placed, is located mostly spatially separated from an area to be assigned to the pre-printing stage, in which area at least the computer 01 of the pre-printing stage is arranged. Preferably, the printing press is configured as a printing press which sequentially prints printed images in several colors, such as, for example, in four different print colors, in the transport direction on the material to be imprinted. For example, the printing press is configured either as a sheet-fed rotary printing press or as a web-fed rotary printing press.

In the preferred embodiment of the present invention, the printing press is configured as a web-fed offset rotary printing press, and in particular is configured as a newspaper-printing press, in which preferably one printing forme is respectively assigned to each page of the printed products to be manufactured. The printing group of this printing press imprints printing images on the material to be imprinted, which material is guided through this printed press, by the use of a conventional wet offset printing process or by the use of a dry offset printing process that is operated without a damping agent. The material to be imprinted is typically configured as a web of material, such as, for example, as a paper web. The printing press preferably imprints the web of material simultaneously on both sides in the course of the web's passage through the printing press. Printing images corresponding to the individual color separations of a page to be produced are respectively imprinted, one after the other, in the transport direction of the web of material.

Alternatively, the printing press can also be embodied as a printing press which is operating in accordance with a rotogravure printing process. Forme cylinders 12 of different diameters can be exchanged for each other in the printing press for producing printed products of different sizes, and in particular of different length. Depending on the forme cylinder 12 being used, further devices, which are participating in the printing process, then must be matched to the product length determined by the respective circumference of the forme cylinder 12. For example, the angular position of a cutting cylinder or a folding cylinder in a folding apparatus situated downstream of the printing group must be correspondingly adjusted. In this case, an illustrating device 13, which provides the illustration on the forme cylinder 12, must be configured in such a way that it is possible, by the use of it, to perform a length-variable illustration, at least in the circumferential direction of the forme cylinder 12.

A further alternative embodiment of the printing press can provide that the printing process is performed without a printing forme, i.e. without the use of a particularly embodied printing forme, in that a latent, such as, for example, an electrostatic, printing image, which corresponds to the raster points to be printed, is formed on an image substrate, such as, for example, on a drum. A further embodiment of a printing press that is configured for accomplishing the printing process, without a printing forme, can consist in that the illustrating device 13 transfers colored printing ink to a material to be imprinted pixel-by-pixel from an ink carrier, for example configured in a cylinder shape, by the use of a light-hydraulic effect. Thus, a direct printing process, or an indirect printing process can be used.

The printing press selected as the example has been schematically represented in FIGS. 1 to 5 in a very simplified form and in each case shows, for example, only two schematically depicted printing units 11, which are stacked to form a tower-of-eight, such as, for example, two H-printing units 11, wherein each H-printing unit 11 has a bridge printing unit and a U-printing unit. Each such bridge printing unit and each such U-printing unit respectively consists of two cylinder pairs, each such cylinder pair consisting of a forme cylinder 12 and of a transfer cylinder, which is not specifically represented. The transfer cylinders of different cylinder pairs, which are, however, a part of the same bridge- or U-printing unit, are placed against each other. A web of material to be printed, which is not specifically represented, vertically passes through each tower-of-eight between the transfer cylinders that are placed against each other. However, other printing group arrangements, which are customary in newspaper printing, can be provided, such as, for example, a satellite arrangement, and in particular a satellite arrangement of nine. The centrally arranged printing cylinder, which is common to the four cooperating transfer cylinders, preferably has its own drive mechanism, which is independent of the drive mechanism of the transfer cylinders and/or respectively associated forme cylinders 12 and which drive mechanism is not in a positive or a mechanical connection with another drive mechanism. For reasons of clarity, only the forme cylinders 12 of each such bridge- or U-printing unit are represented in FIGS. 1 to 5.

In the preferred embodiment of the present invention, each forme cylinder 12 of the printing press has several, such as, for example, four or six, printing image locations, which are not specifically represented, in its axial direction. These axially arranged four or six printing image locations are located, for example, on purposefully embodied printing formes which are respectively arranged on one of the forme cylinders, namely with preferably exactly one of these printing image locations on each printing forme. However, it is also possible to arrange several, such as, for example, two, printing image locations or each of these printing formes. Thus, the printing press is configured, for example, as a so-called 6/2 printing press, preferably intended for newspaper printing. Such a 6/2 printing press is provided with respectively six printing image locations in the axial direction and with two printing image locations in the circumferential direction of each forme cylinder 12. At least a portion of the printing image locations provided in the printing press, or on the printing formes arranged therein, can be embodied to be written on, or preferably to be re-written on, by the use of, for example, a thermal, ablative illustrating method. The respective printing formes can, in particular, be embodied as process-free or as non-processed printing formes, which do not require chemical, or "wet" development. A printing image that is corresponding to one of the color separations of one of the pages to be produced can be formed at each printing image location. In other words, a printing image, corresponding to the raster points to be printed, is formed at each one of these printing image locations, which are selected in the printing press, as a function of the printed product to be manufactured in this printing press. Preferably, all of the printing image locations provided in the printing press, or on the printing formes arranged on the printing press, can be illustrated in-line, or inside of the printing press, so that these printing image locations can be provided with their respective printed image by the use of at least one illustrating device, 13 arranged inside the printing press.

Preferably, as many illustrating devices 13 are assigned to each forme cylinder 12 as each such forme cylinder 12 has printing image locations arranged side-by-side in the axial direction. In connection with newspaper printing, in particular, each illustrating device 13 preferably forms a printing image on a printing forme, which is arranged on a forme cylinder 12 exactly at the respective printing image location which is a part of this printing forme. At least one of the forme cylinders 12 that is arranged in the printing press can have several successive sections, preferably of the same width, in its axial direction. At least one printing forme can be arranged, or at least one printing image location can be provided, in each section on the forme cylinder 12. It can also be possible that several printing image locations can be illustrated, or that several printing formes can be arranged, in each section of the forme cylinder 12, in the circumferential direction of the forme cylinder 12. Preferably, two printing image locations are illustrated, or two printing formes are arranged, in each section of the forme cylinder 12, in the circumferential direction of the forme cylinder 12. One illustrating device 13 is preferably assigned to each different section of the same forme cylinder 12. It is also possible, in particular, to assign each section of the forme cylinder 12 its own illustrating device 13. Alternatively, it can also be provided that the same illustrating device 13 illustrates all printing image locations, or printing formes, of the same forme cylinder 12, in the course of a sequential or a parallel work process. If the printing press has at least two forme cylinders 12, each with at least one printing image location, or with at least one printing forme, which can be illustrated by an illustrating device 13, it is advantageous to provide that the illustrating device 13 which is assigned to one of these forme cylinders 12, illustrates the at least one printing image location, or printing forme, while the other forme cylinder 12, with its at least one printing image location, or printing forme, participates in an ongoing printing process that is being performed by the printing press.

The illustrating device 13 is a physical interface which is generating a printing image and which can, for example, have respectively a single laser system, or can include a laser array consisting of several lasers, or can have any other system which is operable for forming a printing image at a printing image location, or on the printing forme. The printed image which is generated at the printing image location, or on the printing forme, is transferred indirectly, such as, for example, by the use of an offset printing process or of a rotogravure printing process, to the material to be imprinted. However, the illustrating device 13 can also be embodied as an injection system, for example, so that the printing image is formed, without a transferring medium, directly and immediately on the material to be imprinted, such as, for example, on a transfer cylinder.

To control the illustrating device 13, each such illustrating device 13 also has a control device 14. This control device 14 is also arranged in the printing press and is preferably integrated into the component that contains the illustrating device 13. Alternatively, the illustrating device 13 and the control device 14 can also be configured as modules, which are spatially and functionally closely combined with each other. Thus, the illustrating device 13 and its control device 14 are preferably directly coupled with each other. Each illustrating device 13 physically converts the raster point information it has received, preferably in bits, from its associated control device 14, into the printed image to be produced. The control device 14 of each illustrating device 13 is respectively connected to a data line 16 wherein, in accordance with FIGS. 1 and 3 to 5, the data lines 16 of all of the control devices 14 of the illustrating devices 13 arranged in the printing press, which are arranged, for example, in the same bridge-, U- or H-printing unit 11, or in the same printing tower, are connected with at least one computer 17 that is adapted to perform the function of a data manager. The data lines 16 can be arranged in lines, for example in the form of a fiberglass cable, in the form of a coaxial cable, or as a twisted pair cable, or can be embodied to be wireless, such as a radio transmission link. The computer 17, which is embodied as a data manager, is preferably arranged in the spatial vicinity of the printing tower and its associated printing units 11. The printing tower, or at least its printing units 11, together with the illustrating devices 13 assigned to their forme cylinders 12, their respective control devices 14 and the computer 17, which is configured as a data manager, form a machine unit 18, as indicated schematically in each of FIGS. 1 to 5 as a dotted border. The computer 17, which is performing the function of a data manager, can be realized, for example, in an FPGA, or field-programmable gate array or as an ASIC, or application specific integrated circuit, and thus can be embodied as a circuit, or a data switch, which is specialized in regard to the function of data assignment.

A logic unit 21 can preferably be provided as a component of the machine unit 18 which logic unit 21 is, for example, respectively assigned to an H-printing unit 11, and is connected, on the one hand, with the control units 14 that is arranged in the respective H-printing unit 11, and, on the other hand, with the network 09 for the control of and/or monitoring the printing press. The logic unit 21 provides the correct flow control within each respective H-printing unit 11. A drive mechanism control device 22 is also preferably provided as a component of the machine unit 18. This control device 22 controls and, if desired also monitors, the drive mechanisms, and therefore the rotation, of the forme cylinders 12 and transfer cylinders which are arranged in each printing unit 11. The drive mechanism control device 22 can conduct a signal, corresponding to the angular position of one of the forme cylinders 12, to the control device 14 of the illustrating device 13 which is usable for illustrating this forme cylinder 12. This can be done, for example, in order to couple an illustrating speed of the illustrating device 13, which is directed in the circumferential direction of the forme cylinder 12 supporting the printing forme to be illustrated, with the speed of rotation of this forme cylinder 12, so that the speed of rotation of the forme cylinder 12 will be matched to the illustrating speed of the illustrating device 13. A signal corresponding to the angular position of a forme cylinder 12 is obtained by the use of a preferably highly resolving encoder or of another device, which is not specifically represented, detecting the rotation of the forme cylinder 12. The signal to be conducted to the control device 14 of the illustrating device 13, which is assigned to one of the forme cylinders 12, can be transmitted, for example, via the network 09 for use in the control and/or monitoring of the printing press. That signal can be received by the logic unit 21 which is assigned to respectively one H-printing unit 11 and can be transmitted further to the respective control device 14 for coordinating the illustrating process as a function of other processes in the printing unit 11. The other processes, which are affecting the illustrating process, can relate to, for example, the guidance of the material to be imprinted during its transport through the printing press; to an operating position of the forme cylinder 12 to be illustrated with regard to its placement against or removal from contact with a transfer cylinder working together with this forme cylinder 12; to a cutting cylinder or a folding cylinder in a folding apparatus which is arranged downstream of the printing unit 11; to a transverse fold; to a longitudinal fold; to a third fold or to a cutter. All of these devices, as previously mentioned by way of example, which imprint the material to be imprinted or which process it, have an effect on the arrangement of the printing image location to be illustrated by the illustrating device 13 and by its process of use, for example on a printing forme or directly on the forme cylinder 12. Alternatively, or additionally, the encoder, which is detecting the rotation of the forme cylinder 12, can also conduct its output signal directly to the control device 14 of the illustrating device 13 which illustrates this forme cylinder. This can be done in order to couple an illustrating speed of the illustrating device 13, directed in the circumferential direction of this forme cylinder 12, with a speed of rotation of this forme cylinder 12, so that the speed of rotation of the forme cylinder 12 is matched to the illustrating speed of the illustrating device 13. This direct supply of the output signal of the encoder to the control device 14 of the illustrating device 13 has the advantage that the output signal of the encoder is made available to the control device 14 over a short path essentially without delay. This is because looping of the signal through the drive mechanism control device 22 is omitted.

Preferably, each machine unit 18, together with at least one further machine unit 18, can form a section of the printing press. A section control device 23 is assigned to each such printing press section, wherein each such section control device 23 controls or regulates the assignment of the respective printing image locations to be illustrated, as well as controlling higher-order operating modes of the machine unit 18. Preferably, each forme cylinder 12 and/or transfer cylinder of the printing press, of the machine unit 18, or of at least the printing unit 11 in that machine unit 18, has its own respective drive mechanism, such as, for example, an angular-position-regulated electric motor, which is, at least, not in a positive or a mechanical driving connection with other forme cylinders 12 or transfer cylinders of the printing press, with this machine unit 18 or at least with this printing unit 11. Each one of these forme cylinders 12 or transfer cylinders can be rotated independently of the other forme cylinders 12 or of the other transfer cylinders of the printing press, of the machine unit 18 or at least of the printing unit 11. An operating state of the printing press, of the machine unit 18 or at least of the printing unit 11 is provided, in which one of the forme cylinders 12 is illustrated by an illustrating device 13 that is assigned to it, while another forme cylinder 12 of the printing press, of the machine unit 18 or at least of the printing unit 11 simultaneously prints or transfers colored printing ink. It can furthermore be provided that the printing image locations of all of the forme cylinders 12 of the same machine unit 18, or at least of the same printing unit 11 of the printing press, are simultaneously illustrated, while the printing image locations of the forme cylinders 12 of another machine unit 18, or at least of another printing unit 11 of this printing press, print or transfer colored printing ink at the same time.

Figure 2:
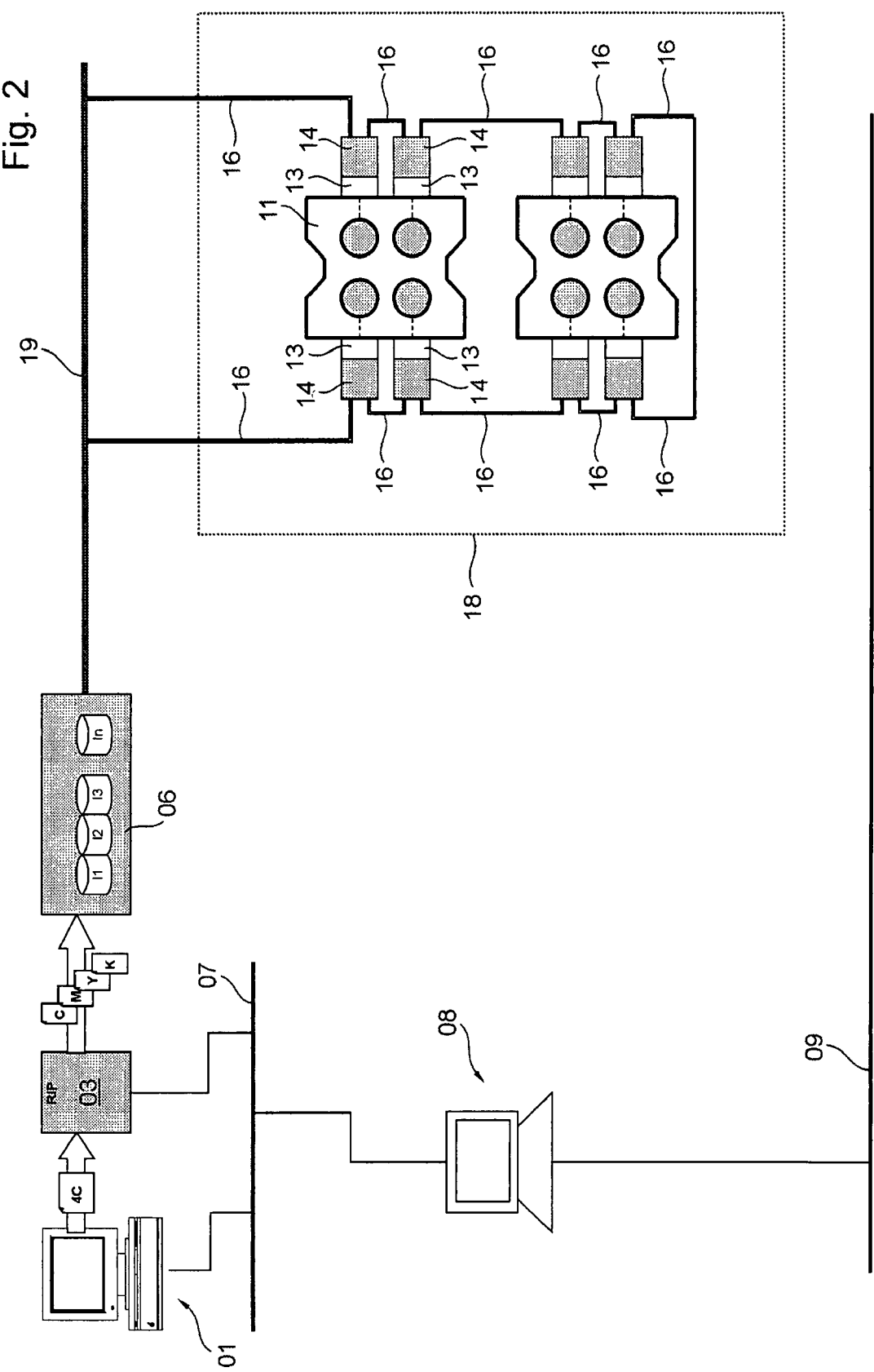
Figure 3:
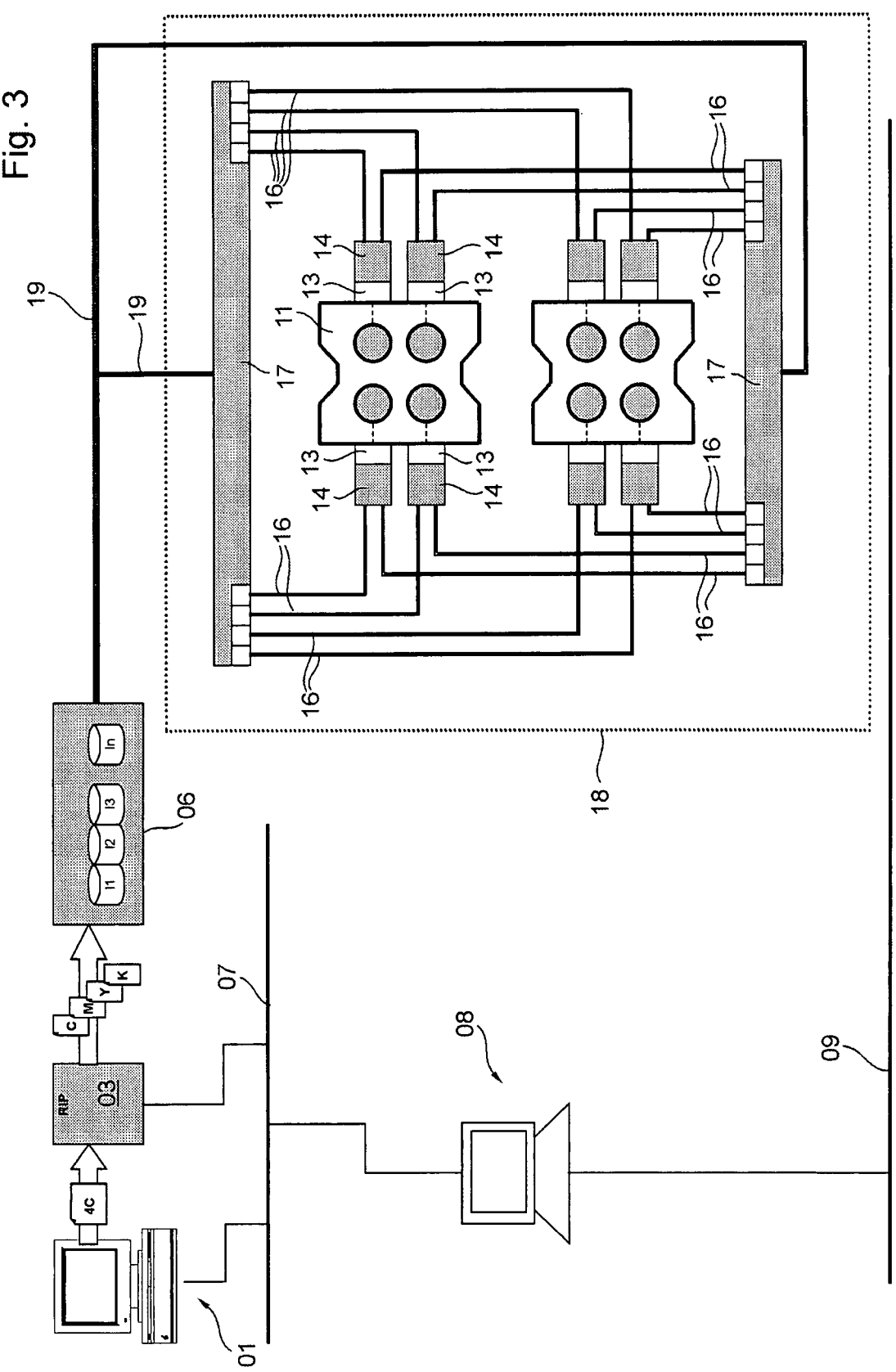
Figure 5:
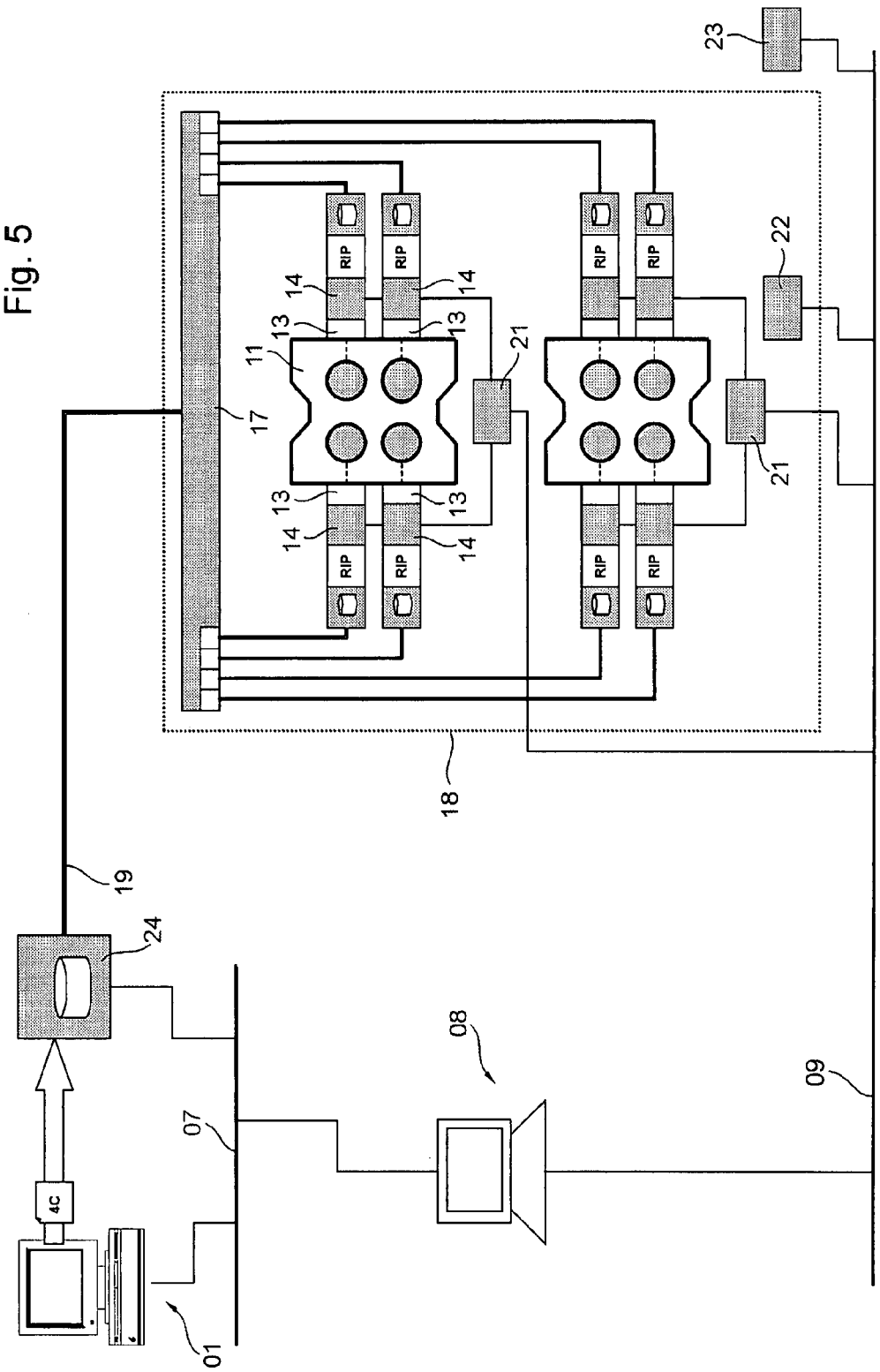

The computer 17, which is embodied as a data manager and which is preferably arranged in or on a machine unit 18, is itself connected to a network 19 for use in preferably electronically transmitting at least image data 02 and, in accordance with the preferred embodiments represented in FIGS. 1 to 3, also for transmitting image data 02 and/or raster data 04. The image data 02, which are a part of a page to be imprinted, and/or the raster data 04, which are a part of one of the color separations of a page to be imprinted, are preferably combined in an appropriate data set. At least the computer 01 of the pre-printing stage, as seen in FIG. 5 and/or the memory device 06, as seen in FIGS. 1 to 3 are also connected to the network 19 for transmitting at least image data 02.

The network 07, for use in communicating, preferably electronically, data to be processed in the pre-printing stage, the network 09 for use in controlling and/or monitoring the printing press, and/or the network 19 for use in electronically transmitting image data 02 and/or raster data 04 can be physically arranged in lines, such as, for example, in the form of a fiberglass cable, in the form of a coaxial cable, or as a twisted pair cable, or can be embodied wireless as a radio transmission link. For example, the networks 07, 09, 19 can be embodied by a linkage technology known by the term ethernet, also called an industrial ethernet, such as, for example, as a fast ethernet with a data transmission rate of 100 MB/s, as a gigabit ethernet with a data transmission rate of 1,000 MB/s, or as a 10 gigabit ethernet with a data transmission rate of 10,000 MB/s. Based on the large amounts of data to be transmitted, the higher data transmission rates are preferably selected for the network 19 for use in transmitting image data 02 and/or raster data 04. The ethernet has been standardized to the greatest extent in IEEE Standard 802.3. Details for configuring an ethernet-based network can be taken from this standard. Configuration of at least a part of at least one of the networks 07, 09, 19 as wireless transmission links is, for example, based on IEEE Standard 802.11, wireless LAN, since such a network supports the ethernet data block format and works together with the ethernet. Each of the networks 07, 09, 19 has preferably been organized in accordance with the TCP/IP protocol, for example.

In the preferred embodiment of the present invention, it has been provided that at least two of the three described networks 07, 09, 19, and preferably all three of the described networks 07, 09, 19, are combined into a single network, so that all of the data which may be required for the operation of the printing press and for illustrating the printing image locations of its forme cylinders are transmitted over a common network. A communication system which combines, in itself, in a common network, all of the network functions which may be required for producing a printed product, starting with the pre-printing stage through the execution of the printing order up to the establishment of statistical data connected with the printing order, has the considerable commercial advantage that physical signal lines and/or transmission links can be commonly used. Because of this, the installation outlay for forming the required network functions is clearly reduced. Furthermore, in an area-spanning communication system, which includes at least one printing press, the manufacturing process of a printed product becomes more transparent and more controllable by the personnel monitoring it.

In the preferred embodiments of the present invention, in accordance with FIGS. 1 to 3, a single central raster image processor, or RIP 03, for example, generates raster data 04 for each of the color separations which belong to a page to be produced and preferably stores these raster data 04 in a memory device 06 that is used as a data buffer. Alternatively, the raster image processor, or RIP, 03 can also forward the raster data 04 directly, without intermediate storage, directly to the computer 17 configured as a data manager, so that the raster data 04 reach, synchronously for illustrating, one of the illustrating devices 13 assigned to respectively one of the forme cylinders 12. Thus, the raster data 04 are respectively passed on to each computer 17, configured as a data manager, via the network 19 for electronically transmitting image data 02 and/or raster data 04, from which data manager computer 17 the raster data 04 are conducted to the respective control device 14 of one of the illustrating devices 13 assigned to a respective one of the forme cylinders 12. The assignment of the raster data 04, correctly meeting the requirements of the correct illustrating device 13, takes place, for example with the inclusion of a command to the computer 08 for the control and/or monitoring of the printing press. This computer 08 has data available, in particular by communicating with the computer 01 in the pre-printing stage, regarding, for example, the occupation of forme cylinders 12, which are part of the printing press, with at least one printing forme respectively having at least one printing image location, as well as data regarding the printing process, and in particular with data regarding the sequence of the color separations which belong to a page to be produced with respect to the transport direction of the material to be imprinted through the printing press. Computer 08 relays this placement information or arrangement information, in the form of a signal, to, for example, the respective control device 14 of one of the illustrating devices 13. The signal which is produced by the computer 08 for control and/or monitoring of the printing press therefore is a control signal for the selective assignment of the raster data 04 to one of the illustrating devices 13.

In connection with the raster-creating process, which is performed in the raster image processor, or RIP, 03, or within the control devices 14, one of which is assigned to each of the illustrating devices 13, the image data 02 and/or the raster data 04 can be matched to local geometric conditions relating to, for example, the printing image location, or to the printing forme to be imprinted. If required, it is also possible to make corrections to the image data 02 and/or to the raster data 04 wherein, for example, a negative or trapezoidal distortion can be corrected and/or spreading and/or scaling can be performed for matching. A correction of the fan-out effect can be performed in the same way. This matching, which may be performed within the meaning of a calibration, and/or a correction of the image data 02 and/or the raster data 04, can alternatively or can additionally provide that the control device 14 calibrates raster points determined by the raster image processor, or RIP, 03 as a function of a colored printing ink to be applied to the printing image location and/or to the printing forme to be illustrated, and/or of a material to be imprinted by the use of the printing image location and/or the printing forme to be illustrated. The control device 14 also calibrates raster points determined by the raster image processor, or RIP, 03 as a function of a signal from an inspection system, which is not specifically represented arranged in the printing press, and which monitors the printing process. The inspection system has, in particular, a camera system which is directed onto the material being imprinted with the printing image and also has an image evaluation system.

In the preferred embodiment, which is represented in FIG. 2, and which relates to the same type of printing press with the same control functions, as has previously been described in connection with FIG. 1, a line or a ring topology has been realized in contrast to the first preferred embodiment described in FIG. 1 as a star topology for the network 19 for transmitting image data 02 and/or raster data 04. A simple redundancy, for increasing the protection against an outage, is provided for linking the control devices 14 which are each respectively assigned to one of the illustrating devices 13. In connection with this preferred embodiment represented in FIG. 2, a computer 17, which performs the function of a data manager, has been omitted. Data sets and/or telegrams, which are sent by the pre-printing stage, and containing, for example, image data 02 and/or raster data 04, are brought directly and immediately to the respective control device 14 of the illustrating device 13. The compact placement of the data lines 16 is advantageous in this embodiment. However, this advantage must be paid for by a division of the bandwidth which can be transmitted.

In the preferred embodiment represented in FIG. 3, which can relate to the same type of printing press with the same machine unit 18 and/or with the same control functions as described in connection with FIG. 1, a double-star topology has been realized, in contrast to the preferred embodiment described in FIG. 1, for the network 19 for transmitting image data 02 and/or raster data 04. This means that all of the control devices 14, which are assigned to one of the respective illustrating devices 13, are each preferably connected to a first computer 17 performing the function of a data manager, as well as being also connected to a further, and in particular to a second computer 17 also performing the function of a data manager. Each one of the first and, for example the second, computers 17, each performing the function of a data manager, is connected with the network 19 for electronically transmitting image data 02 and/or raster data 04. However, the double-star topology can also be realized without the first and second computers 17, each performing the function of a data manager. By the multiple, such as, for example, double, linkage of the control devices 14, which are each assigned to a respective illustrating device 13, with the network 19 for electronically transmitting image data 02 and/or raster data 04, the protection against an outage is also increased. Each one of the control devices 14 is respectively connected with two computers 17, each performing the function of a data manager. Moreover, the particular advantage results that the available bandwidth for the image data 02 and/or raster data 04 to be transmitted to the control devices 14 is increased by the multiple linkage of the control devices 14 to the network 19, for transmitting image data 02 and/or raster data 04. It is thus possible in case of, for example, a double linkage of the control devices 14 to the network 19 for transmitting image data 02 and/or raster data 04, that the bandwidth for these image data 02 and/or raster data 04 to be transmitted can be doubled. With an n-times linkage, this bandwidth can be correspondingly multiplied, wherein n is a whole natural number. The image data 02 and/or the raster data 04 picked up from, and/or distributed by the network 19 for transmitting image data 02 and/or raster data 04, preferably by the use of the computers 17, each performing the function of a data manager, can be assigned to the respectively responsible control devices 14 by the use of a synchronous, or preferably an asynchronous, protocol. Image data 02 and/or raster data 04 which is intended for a defined control device 14, are combined from data packages arriving there at different times and/or via different transmission paths, provided that these image data 02 and/or raster data 04 are not transmitted in a connected manner to the control device 14.

Figure 4:
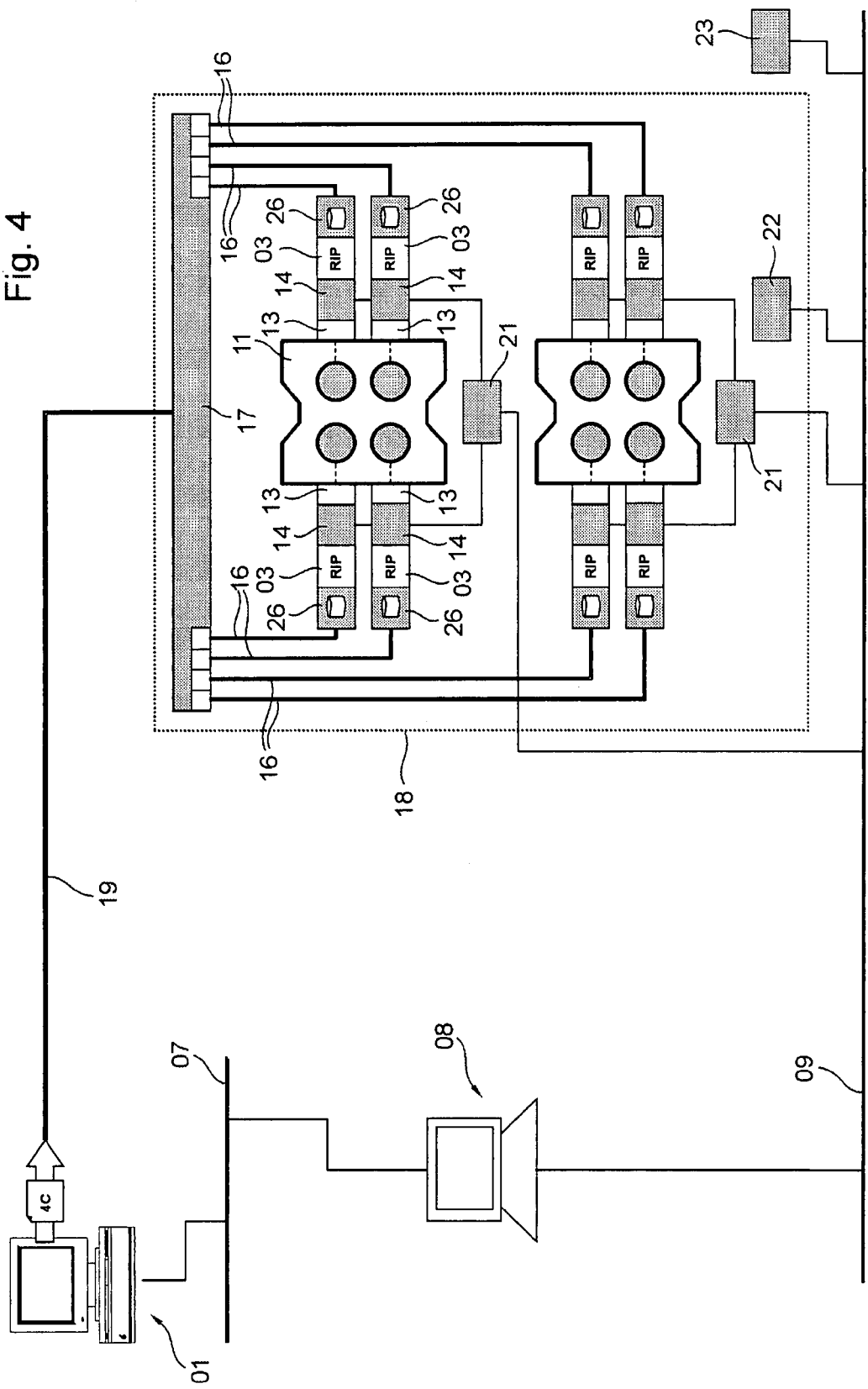

In the preferred embodiment which is represented in FIG. 4, and which relates to the same type of printing press, with the same control functions as was previously described in connection with FIG. 1, image data 02 are respectively combined in the computer 01 of the pre-printing stage to form a page to be imprinted in several, such as, for example, four different printing colors, and are conducted, in the form of a data set or a telegram, via the network 19 for use in transmitting at least image data 02, for example to at least one computer 17 performing the function of a data manager. Accordingly, the network 19 for use in transmitting at least image data 02 transmits data sets containing the complete information regarding pages of a printed product to be preferably manufactured in four-color printing. These data sets can also be in a TIFF format or a JPEG format. Each one of these data sets or telegrams sent by the pre-printing stage 01 can also be directly transmitted to the respective control device 14 of the illustrating devices 13 without the use of an intermediate computer 17 performing the function of a data manager.

In the preferred embodiment which is represented in FIG. 4, the computer 17, performing the function of a data manager, conducts each data set containing the complete information regarding a page to be produced, and transmitted via the network 19 for electronically transmitting at least image data 02, to that control device 14, including the illustrating device 13, which will perform the illustration of the printing image location for the subsequent printing of the printed image as a function of placement information or arrangement information which is made available by the computer 08 for control and/or for monitoring of the printing press. The image data 02 belonging to the pages are thus sent from the computer 17, performing the function of a data manager, by the use of the arrangement information regarding at least one printing image location, or by the placement information regarding at least one printing forme, to the printing image location which, in the printing press, is responsible, with regard to the material to be imprinted. In this case, the assignment provided by the computer 17, performing the function of a data manager, can take into consideration diverse influences affecting the processing of the material to be imprinted or resulting from the intended processing of the material to be imprinted. These can include, for example, the effects of transport devices on the material to be imprinted, as well as also, for example, the number of continuous webs of material to be imprinted, the effects of the folding apparatus, or also the number of pages of the printed product to be manufactured. The assignment of every data set, transmitted via the network 19 for electronically transmitting at least image data 02, which data set contains complete information regarding one page of the printed product to be manufactured, to the respective control device 14 of one of the illustrating devices 13, takes place, for example, either by the use of data which had already been added by the computer 01 of the pre-printing stage to the data set to be transmitted via the network 19 for electronically transmitting at least image data 02, or these data providing an assignment of the pages to the individual printing image locations are linked, for example, in the computer 17 performing the function of a data manager, or in the respective control device 14 of one of the illustrating devices 13, with respective data sets arriving there, which data sets were transmitted via the network 19 for electronically transmitting at least image data 02. Thus, the data made available by the computer 01 of the pre-printing stage, and containing the arrangement information or the placement information, control, either directly or via the computer 08 for control and/or monitoring of the printing press, the computer 17 performing the function of a data manager or the control device 14 of one of the illustrating devices 13 in the sense of a selective further processing of that data set which contains complete information regarding one of the pages of the printed product to be manufactured.

For example, a data set containing the complete information regarding one of the pages of the printed product to be manufactured proceeds from the computer 17 performing the function of a data manager via data lines 16 first to an interface 26, which is in connection with a respective control device 14 of an illustrating device 13 and which is configured at least as a data interface. The interface 26 preferably has a memory, and in particular has a shock-resistant memory, such as, for example, a semiconductor memory, in which memory at least one data set, containing the complete information regarding one of the pages of the printed product to be manufactured and to be made available at the interface 26, is temporarily stored. At the same time, the interface 26 can also be configured as a hardware interface, which is physically connected with at least one of the data lines 16. Each data set containing the complete information regarding one of the pages of the printed product to be manufactured, and received at the interface 26, is conducted, if required after a temporary storage, to a decentralized raster image processor, or RIP 03, which is connected with a control device 14 of an illustrating device 13, and which is a part of the interface 26. The decentralized raster image processor separates the color separation relevant to the respective printing image location from the data set and provides it with a raster. The illustrating device 13 illustrates, by the use of the raster data 04 previously generated in the decentralized raster image processor, or RIP 03, the printing forme arranged on the forme cylinder 12, or the printing image location on the forme cylinder 12, with a printing image.

It is advantageous to temporarily store the raster data 04, generated in a decentralized raster image processor, or RIP 03 in, for example, an intermediate memory which is connected with the respective interface 26 in order to decouple the raster-forming process from the illustrating process. However, this memory can also only buffer a data flow required for illustrating. Data entering the memory, in the course of an ongoing illustrating process, are only briefly stored there and are immediately passed on in accordance with requirements to the next device requiring these data.

The decentralized raster image processors, or RIP 03, retained in connection with each printing image location, have been realized, for example, in an FPGA, or field-programmable gate array, i.e. fixedly implemented. Alternatively, the decentralized raster image processors, or RIP 03, the same as the interface 26 and/or the control device 14, can also be embodied on the basis of software technology, i.e. in the form of a program performing the respective functions, and can perform in a suitable computer. Since each decentralized raster image processor, or RIP 03 needs to perform the raster formation for only a single one of the, for example, four color separations, the performance capacity of this decentralized raster image processor, or RIP 03 can be configured to be less in comparison with a raster image processor, or RIP 03 which is centrally retained in the pre-printing stage.

The concept of local image data processing, as described in connection with FIG. 4, has the advantage that the machine unit 18, with its printing units 11 and its various control devices, constitutes an independent unit, which can independently process and evaluate image data 02 of a page to be produced, which image data 02 have been received from the pre-printing stage. The area of the pre-printing stage and the area to be assigned to the actual printing process, which, in particular, can be embodied as a press room, can be spacially separated. The network 19 for transmitting at least image data 02 can also be a public, such as, for example, a world-wide operating network, such as, for example, the internet or any other network which is suitable for the transmission of electronic data. The data sets containing the complete information regarding a page, are sent over the network, for example, in an encrypted form, by a publishing house, which has put together the respective pages of a printed product to be manufactured, along with its respective image data 02 and/or raster data 04, to a remotely located print shop. Then the assignment of the individual color separations to defined printing image locations preferably occurs only in the relevant machine unit 18. It can also be provided that the computer 01 of the pre-printing stage, or at least the computers 17 performing the function of a data manager, conduct, for example, each data set containing the complete information regarding a page simultaneously, in accordance with a "broadcast" principle, to all printed image locations arranged at the respective machine unit 18. However, only that interface 26 selects the image information from the data sets transmitted, for example, via data lines 16, which data set is the correct one, i.e. is the one intended for it. The image information destined for it results, as a function of the arrangement information or the placement information, from the image information which is assigned to the particular printing image location with which this interface 26 corresponds. At least at every control device 14 of one of the illustrating devices 13, which are arranged at or in the printing press, it is thus possible to selectively pick up, or to filter out, data and/or data sets transmitted, for example, by a computer 01 of the pre-printing stage, by the broadcast method, from the network 19 which transmits them because of a linkage with additional information, i.e. for example the arrangement information or the placement information, and to supply the data or data/sets to a further processing step, and in particular to a raster formation in a raster image processor, or RIP 03. Thus, the respective data set containing image data 02 of all printed images of the page of the printed product is made available at the interface 26 of each raster image processor 03, but only those image data 02 from this data set are further selectively processed which are required for producing the printed image at the respective printing image location.

Different network topologies, which were described, for example, in connection with FIGS. 1 to 3, such as ring topology, star topology or double-star topology, are possible for use in connection with the concept of local image data processing previously described in connection with FIG. 4. A further advantage of decentralized raster image processors, or RIP 03 is that they can perform the raster-forming process parallel, or simultaneously, which means a time advantage, in comparison with a raster image processor, or RIP 03 which is centrally retained in the pre-printing stage. Therefore, the raster-forming process can be performed more rapidly.

The preferred embodiment which is represented in FIG. 5 is based on the preferred embodiment which is represented in FIG. 4. One decentralized raster image processor, or RIP 03 is also respectively provided in the machine unit 18, preferably in association with each printed image location. In contrast with the preferred embodiment represented in FIG. 4, a central file server 24 is provided in FIG. 5, which central file server 24 is connected with the computer 01 in the pre-printing stage and/or with the control console 08, and which stores the image data 02, made available by the area of the pre-printing stage, of a page of a printed product which preferably is to be produced in several colors. Only information regarding the identification and availability of one of the pages of the printed product to be manufactured is sent, for example by the computer 01 of the pre-printing stage, to the control devices 14 each controlling respectively one illustrating device 13. Following the receipt of this information regarding the identification and availability of one of the pages to be produced, the control device 14 controlling an illustrating device 13 obtains the data set regarding the respective location from the central file server 24, such as, for example, by the use of a FTP or file transfer protocol method suitable for data exchange. Each data set which is stored without a raster in the central file server 24 contains the complete information regarding the complete page of the printed product to be manufactured. In the preferred embodiment, which was explained in connection with FIG. 4, the raster-forming process is performed with the aid of decentralized raster image processors, or RIP 03, wherein only the color separation that is required at the respective printing image location is selected from the data set, and a raster is then formed. The central file server 24 is connected, for example via a dedicated line, with the respective machine unit 18. The concept of a central file server 24 has the advantage that each data set containing the complete information regarding the page of the product to be manufactured, can be selectively requested, or called up, as needed, and in particular can be requested on the basis of the arrangement information relating to at least one printing image location, or on the basis of the placement information relating to at least one printing forme.

With all of the preferred embodiments described above, in connection with FIGS. 1 to 5, it is possible to decouple the transmission of the image data 02, the raster data 04, or of the data sets containing the complete information regarding the page of the printed product to be manufactured, from the illustrating process by the use of intermediate storage.

Figure 6:
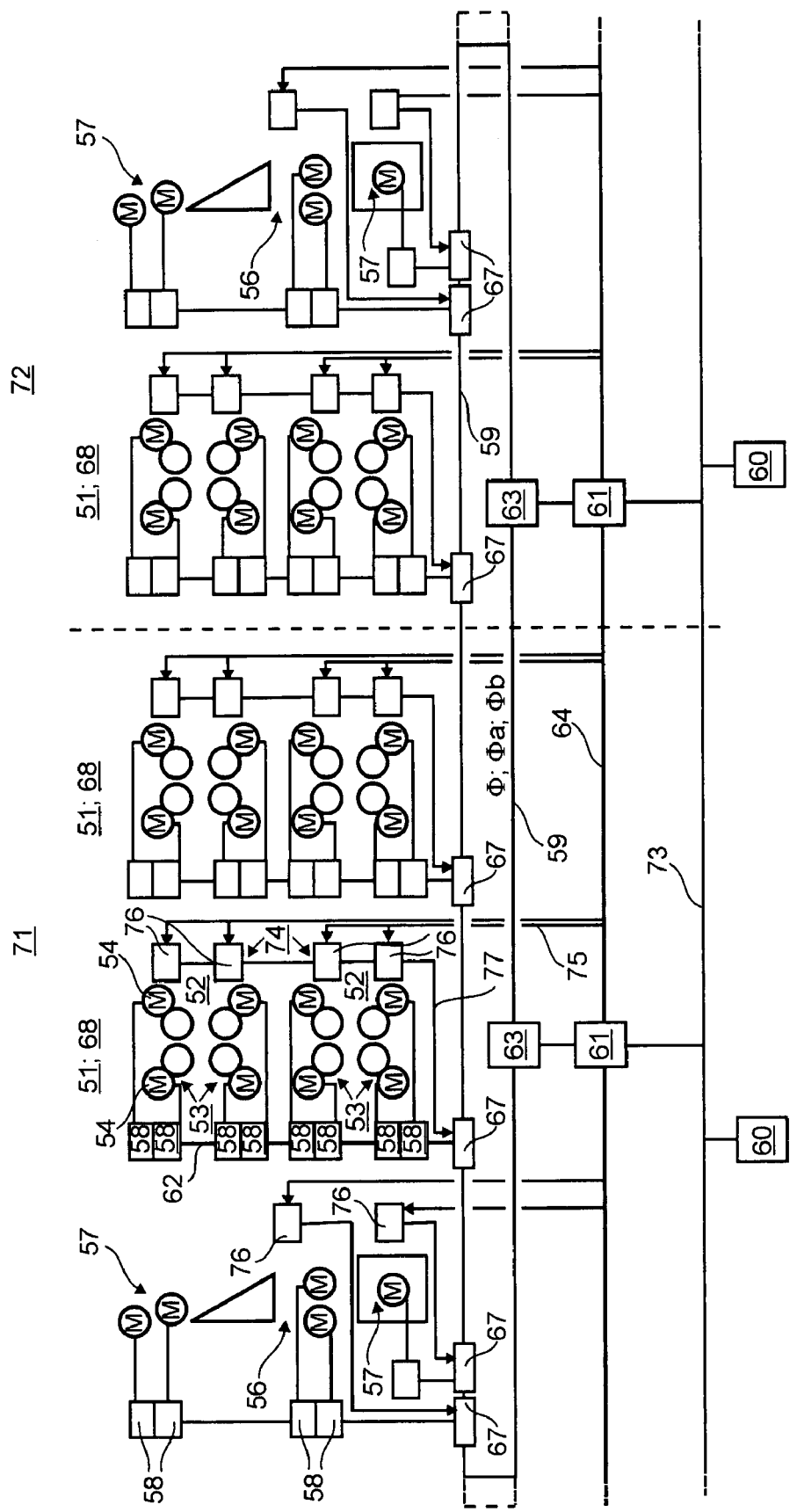

FIG. 6 shows an example of a detailed configuration of the network 09 for controlling and/or for monitoring the printing press, and in particular for controlling drive mechanisms in the printing press. The printing press has a plurality, depicted here as three, printing towers 51, which themselves have several printing groups 53, depicted here as double printing groups 53. Together with their respective drive units 58, or regulating units 58, and their respective associated drive motors M, the printing groups 53 of a printing tower 51 form a group 68, and in particular form a printing location group 68, which is connected with a signal line 59 via a lower order drive mechanism control 57 of this group 68. A computing unit 63, such as, for example, a higher order drive mechanism control 63, can also manage sub-groups 52 of printing groups 53, such as, for example, printing groups 52, or other divisions, with their associated drive units 58, or regulating units 58. Further units, and preferably units having their own lower order drive mechanism controls 67, are also connected with the signal line 59, such as, for example, one or several guide elements 57 and/or one or several folding apparatuses 56. The signal line 59 is here advantageously embodied in a ring topology, and in particular as a double ring, and has one or several of the properties discussed in connection with FIGS. 1 to 5. In particular, at least one illustrating device 13 and a control device 14 are assigned to the respective forme cylinders 12 of the printing units 52, such as was been previously described in connection with FIGS. 1 to 5. For maintaining illustration clarity, the respective illustrating device 13 and control device 14 are not represented in FIG. 6. In the manner described previously in connection with FIGS. 1 to 5, the control unit 14 of each illustrating device 13 is respectively connected, by the use of at least one data line 16, with the network 19 for transmitting image data 02 and/or raster data 04. Lines which are laid in the printing press are used for the transmission of data or of data sets mentioned in connection with the various networks 07, 09, 19.

In accordance with the example of FIG. 6, drive motors M are assigned to the respective drive units 58, or to the regulating units 58, which are connected by the use of at least one data line 59 directly or indirectly with each other, and with a computing and data processing unit 61, such as, for example, a computer 61. The computing and data processing unit 61 can additionally have an operating unit, or can be connected with an operating unit 60, such as, for example, a control console 60. The drive units 58, or regulating units 58 can, in principle, be connected with the signal line 59 in series, in an arrangement which is not represented, directly in a ring, bus or other network structure, or, as represented, in a tree structure by signal lines 62.

At least one signal line 59 conducts signals of a reference shaft position φ, which is specified by a higher order drive control 63. Together with the computing unit 63, the signal line 59 represents the so-called virtual reference shaft 59, 63, or electronic shaft for the units connected with it, on which the units orient themselves with regard to their seating or position. This reference shaft position is passed on to the drive unit 58, or to the regulating unit 58 as a specification or a command value. The computing and data processing unit 61 provides a specification regarding the desired production speed, in particular, to the higher order drive control 63 and is therefore connected with the drive units 58, or the regulating units 58, via the higher order drive control 63, the signal line 59, in cross communication, and the signal lines 62.

A specific offset Δφ, for example an angular offset Δφ, can be specified for each one of the drive units 58, or the regulating units 58, which fixes a permanent, but adjustable displacement in regard to the reference shaft position φ. This offset Δφ can, for example, be directly entered at the drive unit 58, or the regulating unit 58, and/or via the computing and data processing unit 61, and/or can be stored and called up for specific operating situations, and in particular for specific web guidance, in a memory of the computing and data processing unit 61. If the signal line 59 is appropriately configured, for example as a broad-band network, and preferably as a real-time-capable field bus, and even more preferably as a standardized field bus known by the designation SERCOS, the information regarding the respectively specified and fixed offset Δφ, as well as the "rotating" reference shaft position φ, can take place via the common signal line 59, if desired. The signal line 59 can additionally be connected with a respective control system 74, which controls and/or regulates, for example, the actuating members and drive mechanisms, which are different from the drive motors M, of the printing units 52, or of the printing groups 56, such as, for example, the ink supply, the actuating movements of rollers and/or cylinders, the dampening units and the like.

The field bus known by the designation SERCOS has been standardized in accordance with the international standard IEC 61491. Details regarding the design of a SERCOS field bus can be taken from this standard. In contrast to office communication applications, an industrial communication system for use in linking a multitude of field devices is called a field bus, wherein field devices can be embodied as sensors, actuating members or drive mechanisms, and wherein data transmission security in the at least partially quite long transmission paths extending for some hundreds of meters between the decentrally arranged field devices is assured in spite of the rough surroundings in an industrial environment with, for example, its wide temperature ranges, its many types of dirt accumulation and its intense electromagnetic interferences. Various field bus systems, having different properties, have established themselves in the marketplace. However, the basic properties of field bus systems have been standardized in the international standard IEC 61158. The SERCOS field bus is particularly suited for linking drive mechanisms, and in particular for also linking positionally-regulated drive mechanisms. A third-generation SERCOS field bus called SERCOS III makes use of the mechanisms of an ethernet communication system and is real-time-capable, i.e. the signal processing speed required for communications between field devices in a SERCOS network is at least just as fast as the signal-generating sequences, or those to be controlled, for example the rotation of the forme cylinders 12 in the printing press. A further, often employed, field bus is known by the designation PROFIBUS. The properties of this field bus are defined, in particular, in the international standard IEC 61784, taken in connection with the international standard 61158. In an embodiment as a PROFINET, field devices laid out for PROFIBUS are linked, for example by the use of a proxy or a proxy server, i.e. a service program making connections in the data traffic, or a special I/O controller, which also makes connections in the data traffic between field devices, to an ethernet system. A proxy puts respective data into a valid standardized format, preferably for both directions of communication between field devices, for example. Thus, the various networks, 07, 09, 19, are respectively preferably connected with each other by the use of a relay device, which relays the data traffic between the networks, 07, 09, 19, wherein this relay device can be configured as a proxy or a controller.

The respective offset $\Delta\phi$, in respect to the reference shaft position $\phi$, is transmitted, for example prior to the start of production, from the control console 60, or from the computing and data processing unit 61, to the drive units 58, or to the regulating units 58, and is stored there. In an advantageous embodiment, the offset $\Delta\phi$ can be changed during operations, or during production, of the printing press at the drive unit 58, or at the regulating unit 58, itself, and in particular can be changed via the computing and data processing unit 61.

In a variation, the offset values $\Delta\phi$ for the various drive units 58, or for the regulating units 58, can also be stored in the higher order drive control 63. In this case, each drive unit 58, or each regulating unit 58, receives, as a predetermined value, the sum of the rotating reference shaft position $\phi$ and the specific, stored offset value $\Delta\phi$ of the respective drive unit 58, or the regulating unit 58, via the signal lines 59, 62, or, in case of a series connection, only via the signal line 59.

All of the drive units 58, or the regulating units 58, such as, for example, the drive units 58, or the regulating units 58, of the two first units, for example configured as printing towers 51, as well as the drive unit 58, or the regulating unit 58, of the unit configured as a folding apparatus 56, respectively follow the rotating reference shaft position $\phi$ from the higher order drive control 63 with a respectively fixed offset value $\Delta\phi$, relative to the absolute position of the reference shaft position $\phi$.

In the preferred embodiment of the present invention, in accordance with FIG. 6, the signal line 59 is connected with several, and as depicted here, two, higher order drive controls 63, each of which can feed in signals which are different from each other, of a respective reference shaft position $\phi a$, $\phi b$ of a reference shaft, into the signal line 59. This is advantageous, for example, if the printing press, or its printing towers 51 and/or its printing units 52 and/or its printing groups 53, and the associated folding apparatuses 56, as well as guide elements 57 are to be capable of being assigned to several sections 71, 72, which can be operated separately or together. However, production processes and web guidances can exceed or extend beyond the section separation, which is indicated by dashed lines in FIG. 6, and can be guided from printing units 53 of one section to printing units 53 of another section, and/or folding apparatuses 56 of the other section 71, 72. For example, the individual printing towers 51 can be assigned to different folding apparatuses 56. Inside of a printing tower 51, sub-groups, such as, for example, printing units 53, can be assigned to different webs of the material to be imprinted by the use of different web guidance devices. These different webs of material can be conducted to one common folding apparatus 56, or even to different folding apparatuses 56. Thus, logically the sections 71, 72 should not be considered to be rigid, separate units, but should be considered to be cooperating machine units 18. In this preferred embodiment, the two higher order drive controls 63 respectively form a section control device 23, such as has been previously described in connection with FIGS. 1, 4 and 5.

The higher order drive controls 63 receive their specifications regarding the starting point and production speeds in the respective sections 71, 72, and/or the web guidance, from a respectively assigned computing and data processing unit 61 which is, in turn, connected with at least one control console 60. In an advantageous embodiment, the two computing and data processing units 61 are connected with each other via a signal line 64, as well as with a further signal line 73, which connects several, here two, control consoles 60 with each other. Thus, the three signal lines 59, 64, 73 constitute different levels of the network 09 for use in controlling and/or monitoring the printing press. In an advantageous embodiment, data sets to be transmitted through the network 19 for transmitting image data 02 and/or raster data 04, are transmitted at least via the signal line 73, but, if required, they are also transmitted via the signal line 64. Preferably, the control consoles 60 and/or the computing and data processing units 61 manage the respective data and/or data sets with regard to their respectively required data flow, and guide them to their respective target address or retain them, ready for call-up, in a memory device which is configured, for example, as a file server 24. The entire network 09 for controlling and/or monitoring the printing press can preferably be embodied to be ethernet-based in all its various control levels, such as, for example, as a SERCOS III field bus, or as a PROFINET field bus.

Offset values $\Delta\phi$ for the respective production relevant to the individual drive units 58, or to the regulating units 58, are fed by the computing and data processing unit 61, or by the computing and data processing units 61, via the signal line 64, to the respective lower order drive controls 67, which are assigned to the respective drive units 58, or to the regulating units 58, and are preferably stored there and are processed with the reference shaft position $\phi a$, $\phi b$ into the reference shaft positions $\phi$. If sub-groups 52, such as, for example, printing units 52, of a group 68 of, for example a printing tower 51, are assigned to two different webs, the lower order drive control 67 processes, depending on the association of the respective image printing location to one or the other web, the reference shaft position $\phi a$, $\phi b$ of the reference shaft $\phi$ assigned to the appropriate drive unit 58, or regulating unit 58, with the offset value $\Delta\phi$ preset for this web guidance.

However, in this example, the transmission to the lower order drive controls 67 does not take place directly, but instead via a control system 74, which is assigned to the respective group 68, or to the unit, such as, for example, a folding apparatus 56 having its own lower order drive control 67. For example, the control system 74 is connected with the signal line 64, or with the computing and data processing unit 61, either by its own signal lines 75, or by line sections of the signal lines 75 which are components of the signal line 64, embodied as network 64. The control system 74 controls and/or regulates, for example, the actuating members and drive mechanisms, which are different from the drive motors M, of the printing units 52, or the printing location groups 68, or of the printing groups 53, or of the folding apparatuses 56, such as, for example, ink supply, actuating movements of rollers and/or cylinders, dampening units, positions, etc. The control system 74 has one or several, and in particular memory-programmable control units 76. This control unit 76 is connected, via a signal line 77, with the lower order drive control 67. In case of several control units 76, these are also connected with each other by the signal line 77.

In an advantageous embodiment of the present invention, the control system 74, or its control units 76, is/are releasably connected with the signal line 64 by coupling devices, which are not specifically represented, such as, for example, by network coupling devices respectively configured as interface cards, for example by a proxy. Because of this, the group 68 can, in principle, be operated as a self-contained unit, wherein the control of the drive units 58, or of the regulating units 58, takes place via the string of the lower order drive control 67, with the signal line 62, and the control of the further functions of the group 68 takes place via the string of the control system 74. Command values, as well as actual values, and deviations can be entered or can be issued via the coupling device. In this case, the lower order drive control 67 takes over the specification of a reference shaft position φ. For this reason, and for reasons of redundancy, it is advantageous if all of the lower order drive controls 67 are embodied with the option of generating and specifying a reference shaft position φ.

In the embodiment of the present invention, in accordance with FIG. 6, the offset values Δφ are provided to the respective drive control 67 from the signal line 64 via the respective control system 74. In this case, the offset values Δφ can be alternatively issued to the drive units 58, or by the regulating units 58, and can be stored and processed there.

In the preferred embodiment in accordance with FIG. 6, the higher order drive control 63 can be omitted if, for example, one or several groups 68, or one of the units, such as, for example, the folding apparatus 56, which has its own lower order drive control 67, have a lower order drive control 67. In this case, the virtual reference shaft, or reference shaft position φ, can then be specified by one of the drive controls 67, for example.

Separate signal lines 59 or 64, 75, 77 can be provided for the rotation of a reference shaft which is not yet matched to the individual drive units 58, or to the regulating units 58, and for the information regarding the angular position, such as offset values Δφ, or registration deviations. Thus, on the one hand, the basic orientation of the individual drive units 58, or of the regulating units 58, can take place by the transmission and/or change of the offset values Δφ, as can also take place a correction of the angular position which is required in the course of production, in regard to the adjustment of a linear registration, via the separate signal line 64, 75, 77 to the lower order drive controls 67, or to the drive units 58, or to the regulating units 58 themselves. In case of a registration regulation, for example, an appropriate actuating value is fed to the control 67 via the signal line 77 and, in the course of the determination of the specific angular command value position regarding the individual drive unit 58, or the regulating unit 58, this actuating value is superimposed on the command value which is formed by the reference shaft position φ, φa, φb and offset Δφ. By proceeding in this way, an increased data flow over the signal line 59 conducting the reference shaft is avoided. It is also not necessary to transmit many different data packets already matched to the respective drive units 58, or regulating units 58, through this signal line 59. In relation to the individual drive unit 58, or the individual regulating unit 58, this would result in a clearly reduced possible signal rate. The lower order drive controls 67 only manage a tightly limited number of drive units 58, or regulating units 58, so that the data in the signal lines 62 are correspondingly manageable. However, this is not comparable with the number of all drive units 58, or regulating units 58, assigned to a complete section 71, 72.

For all of the described embodiments, at least one reference shaft position φ, φa, φb is specified by at least one drive control 63, 67, at which the drive units 58, or the regulating units 58, of the various units, which are driven mechanically independently of each other, orient themselves regarding their position. A specific offset value Δφ can be assigned to each one of these drive units 58, or regulating units 58, which specific offset value Δφ respectively represents the relative command value position, with regard to the reference shaft position φ, φa, φb of the assigned reference shaft. Thus, for example, for a defined production, respectively specific offset values Δφ in relation to the reference shaft relevant to the production, are assigned to all drive units 58, or to all regulating units 58, which are mechanically independent from each other, of the printing towers 51, or of the printing units 52, or of the printing groups 53, as well as to the assigned drive unit 58, or to the regulating unit 58, of the folding apparatus 56, and possibly the guide elements 57.

Essentially, these offset values are based on purely geometric relationships. They are dependent, for one thing, on the selected web guidance, i.e. on the web path between the individual units. Otherwise, they can be a function of an accidental or of a selected zero position of the individual drive units 58, or regulating units 58. The latter does not apply to the individual drive unit 58, or regulating unit 58, if their zero position coincides with the zero position of the reference shaft.

Figure 7:
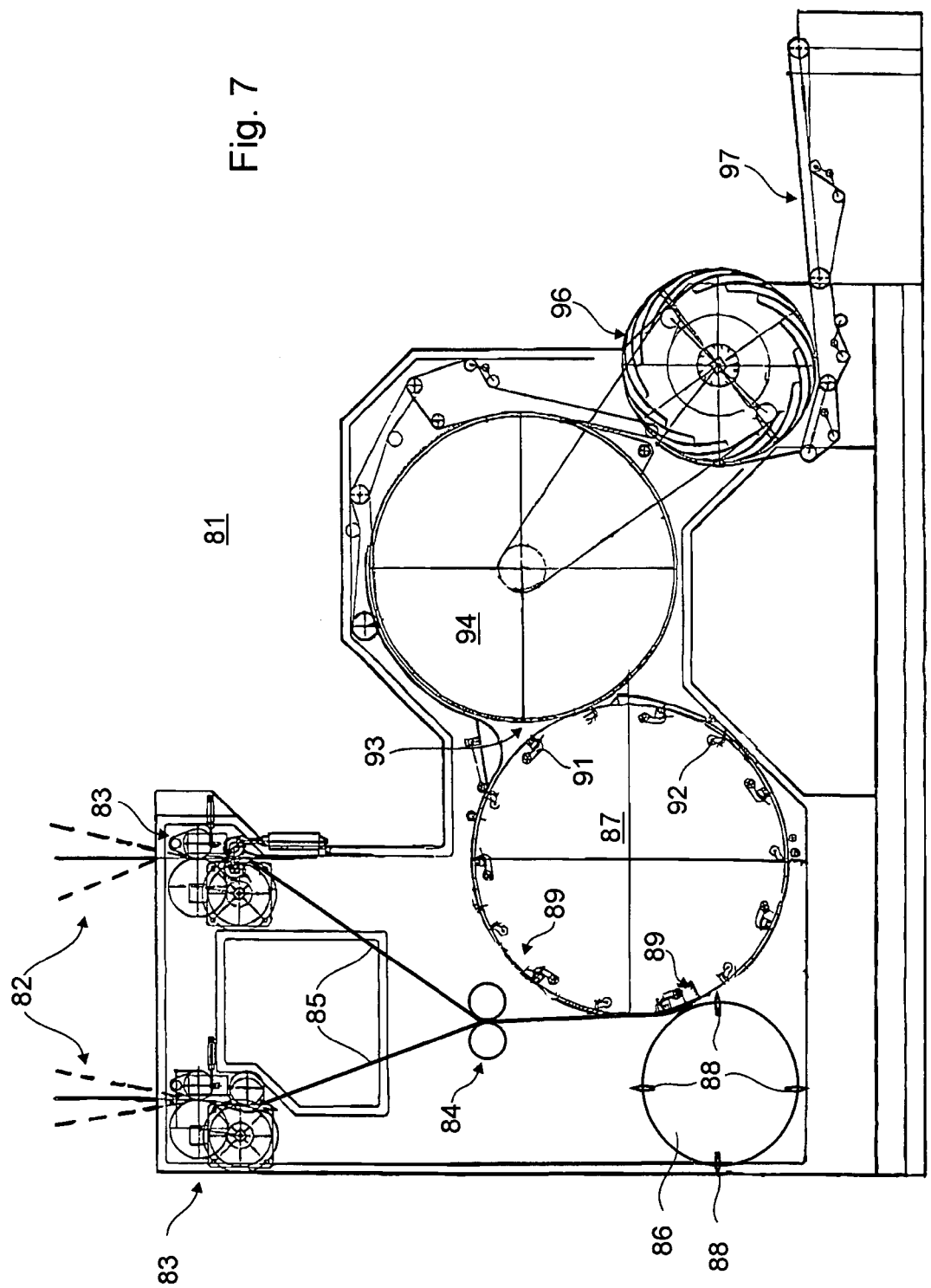

In a simplified representation, FIG. 7 shows, by way of example, a folding apparatus 81 of the printing press. Preferably, several continuous webs 82 of the material to be imprinted, embodied as a web of material, and previously imprinted in the printing press, respectively run, drawn by a pair of draw-in rollers 83, which are driven by a motor, into the folding apparatus 81. Several bundles of continuous web 85 are brought together at a roller pair 84, for example. The continuous webs 82 of material to be imprinted, which have been brought together and placed on top of each other in the web bundles 85, are conveyed by a, for example 7-field transport cylinder 87, which works together with, for example, a four-field cutting cylinder 86. On its circumference, the cutting cylinder 86 has cutters 88, which extend in its axial direction, and which are preferably arranged equidistantly offset and which cutters 88 work together with cutting gaps 89 that are formed in the circumference of the transport cylinder 87. Each copy of the printed product, which has been cut transversely to the conveying direction of the continuous webs 82, is maintained on the shell face of the transport cylinder 87 by a holding device 91, such as, for example, a spur point strip 91, that is arranged on the circumference of the transport member 87.

Furthermore, seven folding blades 92 have been attached to the transport cylinder 87 which folding blades 92, each time they reach a gap 93, either every time or every multiple time, depending on whether the folding apparatus is operating in either collecting or normal operation, between the transport cylinder 87 and a folding jaw cylinder 94 arranged downstream thereof in the conveying direction of the material to be imprinted, are extended for handing over the copies of the printed product conveyed on the transport cylinder 87 to the folding jaw cylinder 94, and to then fold them. To this end, the folding jaw cylinder 94 has, evenly spaced apart in the circumferential direction, for example just as many folding jaws, which are not specifically represented as the number of folding blades 92 and/or holding devices 91 on the transport cylinder 87, in this case seven in particular. The folded copies of the printed product are transferred from the folding jaw cylinder 94 to a paddle wheel 96 and are deposited by the latter on a deposit device 97, such as, for example, a conveyor belt 97. A device for making a third fold, which is not specifically represented, i.e. a second longitudinal fold, can be preferably provided inside the folding apparatus 81.

The folding apparatus 81 which, in the same manner as a printing unit 11, also constitutes a machine unit 18 of the printing press, is preferably also linked with the network 09 for controlling and/or monitoring the printing press, for example in accordance with the detailed representation in FIG. 6. Because of this linkage, it is possible to control at least one, and preferably each one of the illustrating devices 13, which provided in the printing press, together with its control unit 14, as a function of the folded product to be made in the folding apparatus 81. It is, in particular, possible to control at least one printing image location to be illustrated as a function of a cutting register of the folding apparatus 81.

While preferred embodiments of a device for producing a printed image at least one printed image location, in accordance with the present invention, have been set forth fully and completely hereinabove, it will be apparent to one of skill in the art that various changes in, for example, the specific type of webs being printed, the specific structure of the illustrating device and the like could be made without departing from the true spirit and scope of the present invention which is accordingly to be limited only by the appended claims.

What is claimed is:

1. A device to produce a printed image at least at several individual printing image locations comprising:
    a printing press having at least the several individual printing image locations;
    at least one illustrating device, the at least one illustrating device being usable to form at least one individual printed image at each of the several individual printing image locations of the printing press, the at least several individual printed images each formed at one of the several individual printing image locations being part of a resultant page of a printed product to be produced by the printing press;
    a data set containing image data of the at least several individual printed images of the resultant page of the printed product, the data set being in existence prior to the formation of the several individual printed images, and wherein the data set contains image data of all of the several individual printed images of the resultant page of the printed product;
    a raster image processor assigned to each of the several individual printing image locations, each such raster image processor being usable to convert image data in the data set add which corresponds to one of the several individual printed images of the resultant page of the printed product, and which is assigned to the respective printing image location, into raster data;
    a network for electronic communication of at least the data set that contains the image data; and
    a separate interface usable to connect each raster image processor to the network, which separate interface receives the data set containing the image data sent through the network, which network makes the data set containing the image data of all of the at least several individual printed images of the resultant page of the printed product available at the separate interface for each raster image processor.

2. The device in accordance with claim 1, characterized in that each printing image location is arranged on a forme cylinder.

3. The device in accordance with claim 1, characterized in that the printing press has a plurality of forme cylinders which are arranged following each other in a transport direction of a material being imprinted in the printing press.

4. The device in accordance with claim 3, characterized in that respectively one illustrating device is assigned to each of the plurality of forme cylinders.

5. The device in accordance with claim 4, characterized in that each one of the illustrating devices forms least one printed image at the respective printing image location of the respective forme cylinder.

6. The device in accordance with claim 1, characterized in that the interface of each raster image processor selectively takes the portion of the image data to be provided with a raster from the network for electronic communication of at least image data on the basis of at least one of provided arrangement information and placement information relating to the printing image location.

7. The device in accordance with claim 1, characterized in that the at least one illustrating device, and each interface, together with a control device, controlling the at least one illustrating device, are respectively arranged in the printing press.

8. The device in accordance with claim 3, characterized in that an illustrating device with a control device having a raster image processor is provided for each of the plurality of forme cylinders of the printing press.

9. The device in accordance with claim 3, characterized in that each of the plurality of forme cylinders has a plurality of printing image locations in at least one of its axial direction and in its circumferential direction.

10. The device in accordance with claim 1, characterized in that the image data are provided in the form of at least one of a TIFF data set, a postscript data set, and a data set in a pdf format.

11. The device in accordance with claim 1, characterized in that the network for electronic communication of at least image data is configured as a local network.

12. The device in accordance with claim 1, characterized in that the network for electronic communication of at least image data is configured as a public network.

13. The device in accordance with claim 1, characterized in that each interface receives the image data which have been transmitted one of over lines and in a wireless manner.

14. The device in accordance with claim 1, characterized in that each interface receives the image data from a computer of a pre-printing stage.

15. The device in accordance with claim 1, characterized in that a memory device is provided, wherein the memory device stores image data received from each interface at least one of prior to and after their conversion in the raster image processor.

16. The device in accordance with claim 7, characterized in that the control device calibrates raster points determined by each raster image processor as a function of a location intended for the printing image location in the printing press.

17. The device in accordance with claim 7, characterized in that the control device calibrates raster points determined by each raster image processor as a function of at least one of a colored printing ink to be applied to the printing image location and of a material to be imprinted with a printed image formed at the printing image location.

18. The device in accordance with claim 7, characterized in that the control device calibrates raster points determined by the raster image processor as a function of a signal from an inspection system which is arranged in the printing press and monitors the printing process.

19. The device in accordance with claim 7, characterized in that the control device is connected with a computer for control and monitoring of the printing press.

20. The device in accordance with claim 19, characterized in that the computer for control and monitoring of the printing press is connected to a network for controlling and monitoring the punting press.

21. The device in accordance with claim 19, characterized in that the computer for control and monitoring of the printing press is one of embodied as a control console, which is a part of the printing press, and is at least integrated into a control console, which is a part of the printing press.

22. The device in accordance with claim 2, characterized in that an illustrating position of the at least one illustrating device, and selected at the circumference of the forme cylinder, is selected as a function of an angular position of this forme cylinder.

23. The device in accordance with claim 2, characterized in that an illustrating speed of the at least one illustrating device, which is oriented in the circumferential direction of the forme cylinder, is selected as a function of a speed of rotation of this forme cylinder.

24. The device in accordance with claim 1, characterized in that each raster image processor is realized in an FPGA (field-programmable gate array).

25. The device in accordance with claim 7, characterized in that the control device, each raster image processor, and the interface are configured on the basis of software technology.

26. The device in accordance with claim 1, characterized in that the at least one illustrating device forms the printed image at the printing image location on a printing forme.

27. The device in accordance with claim 26, characterized in that the printing forme is suitable for one of a wet offset printing process and for a dry offset printing process operated without a wetting agent.

28. The device in accordance with claim 26, characterized in that the printing forme can be repeatedly illustrated.

29. The device in accordance with claim 26, characterized in that the printing forme has exactly one printing image location to be illustrated by the at least one illustrating device.

30. The device in accordance with claim 1, characterized in that the printing press has at least two printing image locations, which are to be illustrated by the at least one illustrating device wherein, in one operating stage of the printing press, a first illustrating device illustrates at least one of the at least two printing image locations, while another of the at least two printing image locations participates in an ongoing printing process of the printing press.

31. The device in accordance with claim 1, characterized in that the printing press one of directly and indirectly imprints a material to be imprinted, and which material is transported by the printing press.

32. The device in accordance with claim 2, characterized in that a drive mechanism control is provided for controlling a drive mechanism of the forme cylinder.

33. The device in accordance with claim 32, characterized in that the drive mechanism control conducts a signal corresponding to the angular position of the forme cylinder to a control device of the at least one illustrating device which illustrates the forme cylinder.

34. The device in accordance with claim 2, characterized in that in its axial direction the forme cylinder has several sections which follow each other, and wherein each section has at least one printing image location.

35. The device in accordance with claim 34, characterized in that several of the printing image locations are provided in the circumferential direction on each section of the forme cylinder.

36. The device in accordance with claim 34, characterized in that two printing image locations are provided in the circumferential direction on each section of the forme cylinder.

37. The device in accordance with claim 34, characterized in that one illustrating device is assigned to each of different sections of the forme cylinder.

38. The device in accordance with claim 34, characterized in that an illustrating device is assigned to each section.

39. The device in accordance with claim 34, characterized in that the at least one illustrating device illustrates all printing image locations to be illustrated on the forme cylinder in one of a sequential operating process and a parallel operating process.

40. The device in accordance with claim 1, characterized in that the printing press is configured as one of a web-fed rotary printing press and a sheet-fed rotary printing press.

41. The device in accordance with claim 3, characterized in that the plurality of forme cylinders are driven independently of each other.

42. The device in accordance with claim 3, characterized in that the plurality of forme cylinders can be one of coupled separately and independently from each other into an ongoing printing process, and can be uncoupled separately and independently from each other from an ongoing printing process.

43. The device in accordance with claim 1, further including a pre-printing stage for the printing press and wherein the network for communicating data to be processed in the pre-printing stage is provided in the pre-printing stage.

44. The device in accordance with claim 43, further including a computer in the pre-printing stage and wherein the computer in the pre-printing stage is connected to the network for communicating data to be processed in the pre-printing stage.

45. The device in accordance with claim 43, further including a computer for at least one of control and monitoring of the printing press and wherein the computer is connected with the network for communicating data to be processed in the pre-printing stage provided in the pre-printing stage.

46. The device in accordance with claim 43, characterized in that one of a signal line and a transmission path, which is assigned to at least one of the network for electronic communication of at least image data, and the network for controlling and monitoring the printing press, and the network for communicating data to be processed in the pre-printing stage, can be commonly used by at least two of these networks.

47. The device in accordance with claim 20, characterized in that a section control device is connected with the network for controlling and monitoring the printing press.

48. The device in accordance with claim 47, characterized in that the section control device controls at least one assignment of image printing locations to be illustrated to the respective forme cylinder within a section having a plurality of forme cylinders.

49. The device in accordance with claim 3, characterized in that each of the plurality of forme cylinders having a printing image location to be illustrated has a reference shaft position (Phi, Phi a, Phi b), which is defined in respect to a reference shaft defined in the printing press, and wherein the at least one illustrating device assigned to the printing image location of one of the plurality of the forme cylinders to be illustrated illustrates the printing image location as a function of the reference shaft position (Phi, Phi a, Phi b) of this forme cylinder.

50. The device in accordance with claim 20, further including a folding apparatus and wherein the network for controlling and monitoring the printing press, controls the at least one of the illustrating device provided in the printing press to illustrate at least one printing image location to be illustrated as a function of a cutting register of the folding apparatus.

51. The device in accordance with claim 1, characterized in that the at least one illustrating device is configured as one of a single laser system and as a laser array consisting of several lasers.

52. The device in accordance with claim 1, characterized in that the at least one illustrating device is embodied as an inkjet system.

53. The device in accordance with claim 1, characterized in that the at least one illustrating device forms a latent printed image on an image substrate at the printing image location.

54. The device in accordance with claim 1, characterized in that the at least one illustrating device transfers colored printing ink from a color ink carrier pixel-by-pixel to the material to be imprinted by utilizing a light-hydraulic effect.

55. The device in accordance with claim 1, characterized in that the network for electronic communication of at least the data set that contains the image data makes available the data set with the image data of all printed images on the page of the printed product simultaneously at the interface of each raster image processor.

* * * * *

UNITED STATES PATENT AND TRADEMARK OFFICE
CERTIFICATE OF CORRECTION

PATENT NO. : 8,004,706 B2  
APPLICATION NO. : 11/793627  
DATED : August 23, 2011  
INVENTOR(S) : Birkenfeld et al.

Page 1 of 1

It is certified that error appears in the above-identified patent and that said Letters Patent is hereby corrected as shown below:

Column 23, claim 1, line 47, after "set", change "add" to --any--.

Signed and Sealed this
Eighth Day of November, 2011

David J. Kappos
*Director of the United States Patent and Trademark Office*